(12) United States Patent
Sivan

(10) Patent No.: US 7,703,995 B1
(45) Date of Patent: Apr. 27, 2010

(54) ERGONOMIC APPARATUS FOR STABILIZING SUPPORT OF PORTABLE VIDEO DEVICES

(76) Inventor: Aneesh Sivan, 26 Westspring Way, Lutherville, MD (US) 21093

( * ) Notice: Subject to any disclaimer, the term of this patent is extended or adjusted under 35 U.S.C. 154(b) by 406 days.

(21) Appl. No.: 11/730,941

(22) Filed: Apr. 5, 2007

(51) Int. Cl.
  *G03B 17/00* (2006.01)

(52) U.S. Cl. .................. 396/421; 224/185; 352/243; 248/187.1

(58) Field of Classification Search ......... 396/419–421, 396/428; 224/185; 352/243; 248/177.1, 248/178.1, 183.1, 183.2, 187.1, 637, 647
See application file for complete search history.

(56) References Cited

U.S. PATENT DOCUMENTS

| | | | |
|---|---|---|---|
| 2,603,134 A | 7/1952 | Burnam | |
| 2,658,435 A | 11/1953 | Sarvoy | |
| 3,332,593 A | 7/1967 | Fauser | |
| 4,083,480 A * | 4/1978 | Lee et al. | 224/185 |
| 4,943,820 A | 7/1990 | Larock | |
| 4,963,904 A | 10/1990 | Lee | |
| 4,967,282 A | 10/1990 | Malavasi | |
| 4,976,387 A | 12/1990 | Spianti | |
| 5,243,370 A | 9/1993 | Slater | |
| 5,435,515 A | 7/1995 | DiGiulio et al. | |
| 5,650,821 A | 7/1997 | Hewlett | |
| 5,890,025 A | 3/1999 | Hart | |
| 6,149,112 A | 11/2000 | Thieltges | |
| 6,652,431 B1 | 11/2003 | Mattox | |
| 6,929,409 B2 | 8/2005 | DeSorbo et al. | |
| 7,128,354 B2 | 10/2006 | Wu | |

\* cited by examiner

*Primary Examiner*—Christopher E Mahoney
*Assistant Examiner*—Autumn Parker
(74) *Attorney, Agent, or Firm*—Rosenberg, Klein & Lee

(57) ABSTRACT

An ergonomic apparatus is provided for stabilizing support of portable video devices. The apparatus generally includes a longitudinally extended neck member supporting a device mount coupled thereto, a spine member coupled to extend transversely from the neck member, and a pair of stabilizing arm members extending laterally from a lower portion of the neck member. The spine member includes a weighted stop member adjacent a free end thereof; and, each stabilizing arm member suspends stabilizing weight in laterally offset manner from the neck member. The mechanical forces imparted to a video device mounted on the device mount are thereby dampened for stabilizing video images generated thereby.

20 Claims, 7 Drawing Sheets

ERGONOMIC APPARATUS FOR STABILIZING SUPPORT OF PORTABLE VIDEO DEVICES

BACKGROUND OF THE INVENTION

1. Field of the Invention

The subject ergonomic apparatus for stabilizing support of portable video devices is generally directed to an apparatus to which a video camera or other such video device may be mounted for use. More specifically, the ergonomic support apparatus is one which provides a structure that effectively dampens potential image-shaking forces to which a portable video device may otherwise be vulnerable to. The subject apparatus provides such in an ergonomic structure which eases fatigue and strain normally associated with prolonged periods of portable video device operation.

With the rapid development of video technology, the prevalence of increasingly compact yet high image quality video capture/recording devices has steadily grown in recent years. Devices such as mini digital video (DV) cameras and the like adapted literally for 'handheld' operation have become quite commonplace. The advancements in video technology enable the images acquired by even such highly compact devices to rival in quality those acquired by more substantial and costly professional models. The very compactness which makes them so attractive to many a user, however, also makes them vulnerable to excessive instability in the captured video.

That they are lightweight and compact allows such devices to be easily carried and used often by simply holding in the palm of one's hand. While the inherent advantages of such portability and convenient utility are many, the captured video often suffers from excessive shaking or shuttering movement which most viewers would find highly bothersome. Even in the steadiest of hands, the inherent image instability—especially where the video was captured while moving to follow the action—is at best distracting, and usually quite dizzying.

Despite this, not all perceivable movement in video images is necessarily undesirable. In video images captured, for instance, by much larger and bulkier broadcast camera devices of the type employed for direct-feed broadcast applications, for instance, the image movements appear in significantly more dampened form to the user. They are far less shaky or trembly than comparable images captured using more compact devices, noticeably so to most. Even when the video is captured while moving to follow the action, the resulting image movements are closer to those of natural eye perception when viewed live. Hence, the images captured by these cameras of substantial size and mass are typically quite tolerable, and often even desirable for their realistic, live view effect.

Electronic image stabilization and other such remedial techniques are known in the art to address to the image shaking problem in compact video devices. Such known techniques, however, are of limited effectiveness. Many even impair portions of the images for the sake of stabilization, yet fail to provide adequate improvement. Individuals who are even the most moderate visual perception will readily discern images captured using compact handheld-type devices from images captured using more substantial devices as broadcast video cameras and the like.

Another drawback of compact portable video devices is found in the very fact that they are handheld when operating. They may of course be mounted to a tripod or other support, but doing so severely restricts the user's mobility. Maximum flexibility of use, therefore, requires that the video device be held by the user so that it may be dynamically relocated and re-oriented as necessary. This presents a problem for prolonged periods of use, as the user must often hold the video device by hand at approximately eye level for the entire duration. It does not take long for fatigue to set in.

Additionally, such video devices are often configured to be held by either the right hand or the left hand (usually the right), so the user cannot readily transfer the device from one hand to the other during operation. The same hand must continue to hold the device exclusively.

Also a factor is the obstructed access to the video device's full range of controls. Many manufacturers distribute the device's various controls over virtually of all available sides of the device to maximize its compactness. During handheld operation, then, the user is able to actually access only those controls not covered by the palm of the device-holding hand. While this may be acceptable for most modes of operation, it is hardly acceptable where the more sophisticated features of the video device are to be invoked. The controls required for such features are infrequently used and therefore usually placed at those portions least accessible during device operation; hence it may be a very difficult, if not impossible, a task to get at the required combinations of controls—at least to do so without pausing the device's operation and setting it down for access.

There is therefore a need for an apparatus whereby the shaking, trembling, vibratory, or other such undesirable movements otherwise perceivable in video images captured by a device are alleviated. There is a need for such apparatus by which the fatigue on the user during prolonged periods of user-carried operation is also alleviated. There is a need, moreover, for such apparatus whereby a user may conveniently and quite effortlessly manipulate the video device and have ready access to the full range of its controls without interrupting operation.

2. Prior Art

User-carried assemblies for supporting video devices are known in the art. The best prior art known to Applicant includes U.S. Pat. Nos. 7,128,354; 6,929,409; 6,652,431; 6,149,112; 5,890,025; 5,650,821; 5,435,515; 5,243,370; 4,976,387; 4,967,282; 4,963,904; 4,943,820; 3,332,593; 2,658,435; 2,603,134. A number of known assemblies employ a rig or other support structure having a rigid arm that provides canti-levered support for a device mount against the user's body. These and other known support structures, however, lack the combination of ergonomic support and video image stabilizing features realized by the subject ergonomic apparatus for stabilized support of portable video devices.

SUMMARY OF THE INVENTION

It is a primary object of the present invention to provide an apparatus whereby the shaking, trembling, vibratory, or other such undesirable movements otherwise perceivable in video images captured by a device are alleviated.

It is another object of the present invention to provide an ergonomic apparatus whereby fatigue during prolonged periods of user-carried operation is alleviated.

It is yet another object of the present invention to provide an apparatus whereby a user may conveniently and effortlessly manipulate the video device and have ready access to the full range of its controls without interrupting operation.

These and other objects are attained in an ergonomic apparatus formed in accordance with the present invention for stabilizing support of portable video devices. The apparatus generally includes a longitudinally extended neck member supporting a device mount coupled thereto, a spine member coupled to extend transversely from the neck member, and a pair of stabilizing arm members extending laterally from a lower portion of the neck member. The spine member includes a weighted stop member adjacent a free end thereof; and, each stabilizing arm member suspends stabilizing weight in laterally offset manner from the neck member. The mechanical forces imparted to a video device mounted on the device mount are thereby dampened for stabilizing video images generated thereby. In certain preferred embodiments, the apparatus is formed to define a center of gravity substantially at an intermediate portion of the spine member, whereby the apparatus is maintained in user manipulable manner about a shoulder of the user responsive to the spine member being supported intermediately thereon.

DETAILED DESCRIPTION OF THE PREFERRED EMBODIMENTS

Referring now to FIGS. 1-6, there is illustrated an ergonomic apparatus 10 for stabilizing support of portable video devices formed in accordance with one exemplary embodiment of the present invention. In broad scope, apparatus 10 is formed with a frame structure whose members and components are configured and arranged in such a way that they provide a dampening effect against vibratory, shaking, trembling, or other image de-stabilizing movements otherwise imparted to a portable device such as handheld video cameras during video capture.

In accordance with one aspect of the present invention, apparatus 10 provides such stabilizing support for a portable video device in a highly ergonomic manner, when simply 'slung' over a user's shoulder for use during video device operation. When thus 'slung' over a user's shoulder, with a transversely extended spine member 200 of the apparatus 10 resting at an intermediate portion upon the user's shoulder, the user's shoulder serves essentially as a fulcrum. Apparatus 10 provides suitable balancing to enable the user to manipulably control the apparatus (and video device mounted thereto) quite effortlessly, with hands and arms at comfortably relaxed and unstrained positions. Prolonged periods of continuous video device operation may thus be supported by use of apparatus 10 without the fatigue and excessive physical strain invariably endured by the user otherwise.

Apparatus 10 is generally constructed with frame members having substantial strength and weight to provide the desired dampening effect for stabilizing video images captured by the given video device. Any suitable material known in the art having sufficient rigidity and density to provide such steadying degree of support may be employed, subject to the specific requirements of the intended application. In the illustrated embodiment, the various frame members and components like the various weighting members are preferably formed of a steel or other suitable metallic material. The actual choice of material composition, however, will depend on such considerations as the environmental factors to which the apparatus will be subjected, the specifications of the particular video device to be supported, the resources available, and other factors pertaining to the specific application intended.

Figure 1:
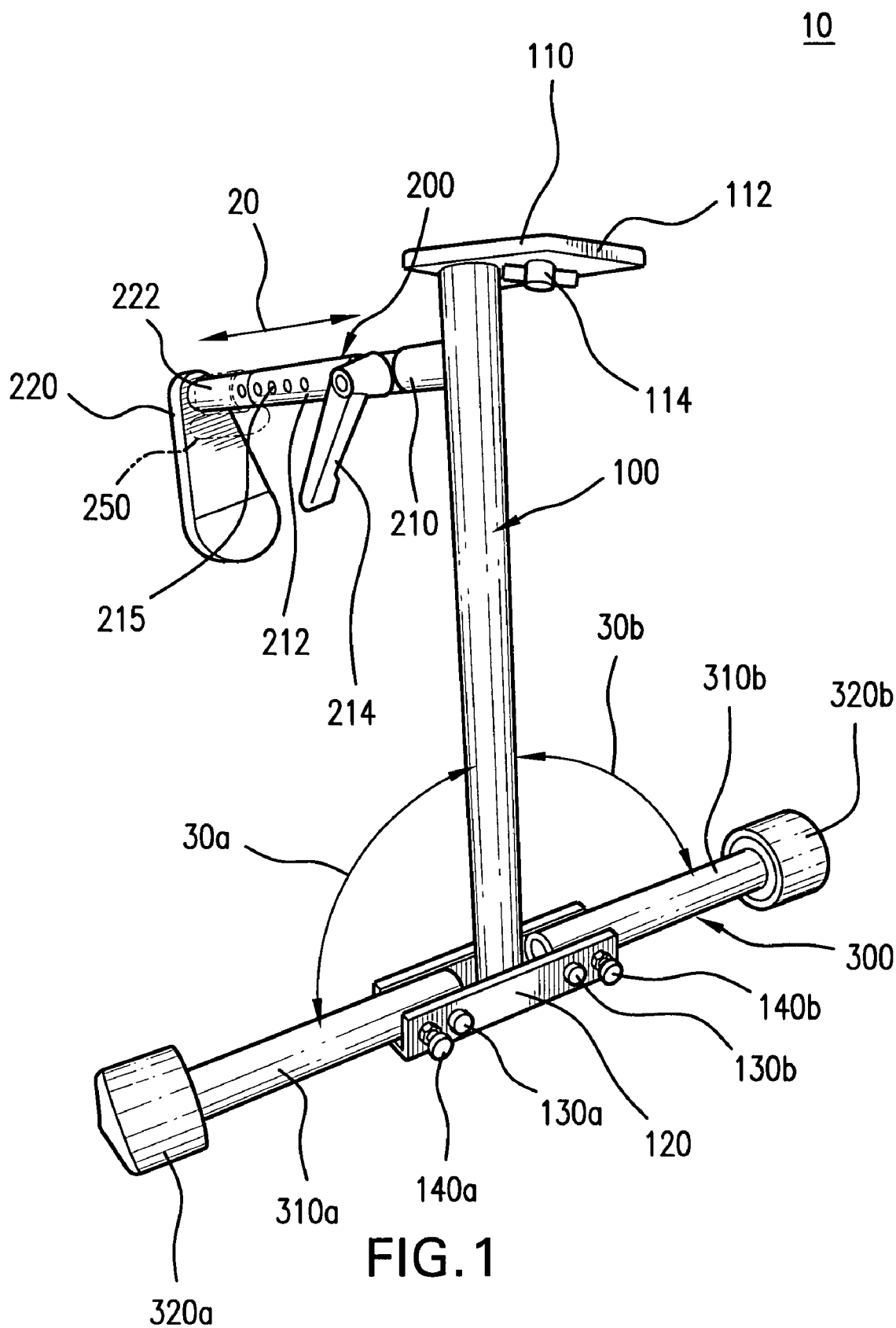
FIG. 1 is a perspective view of an apparatus formed in accordance with an exemplary embodiment of the present invention.
Figure 2:
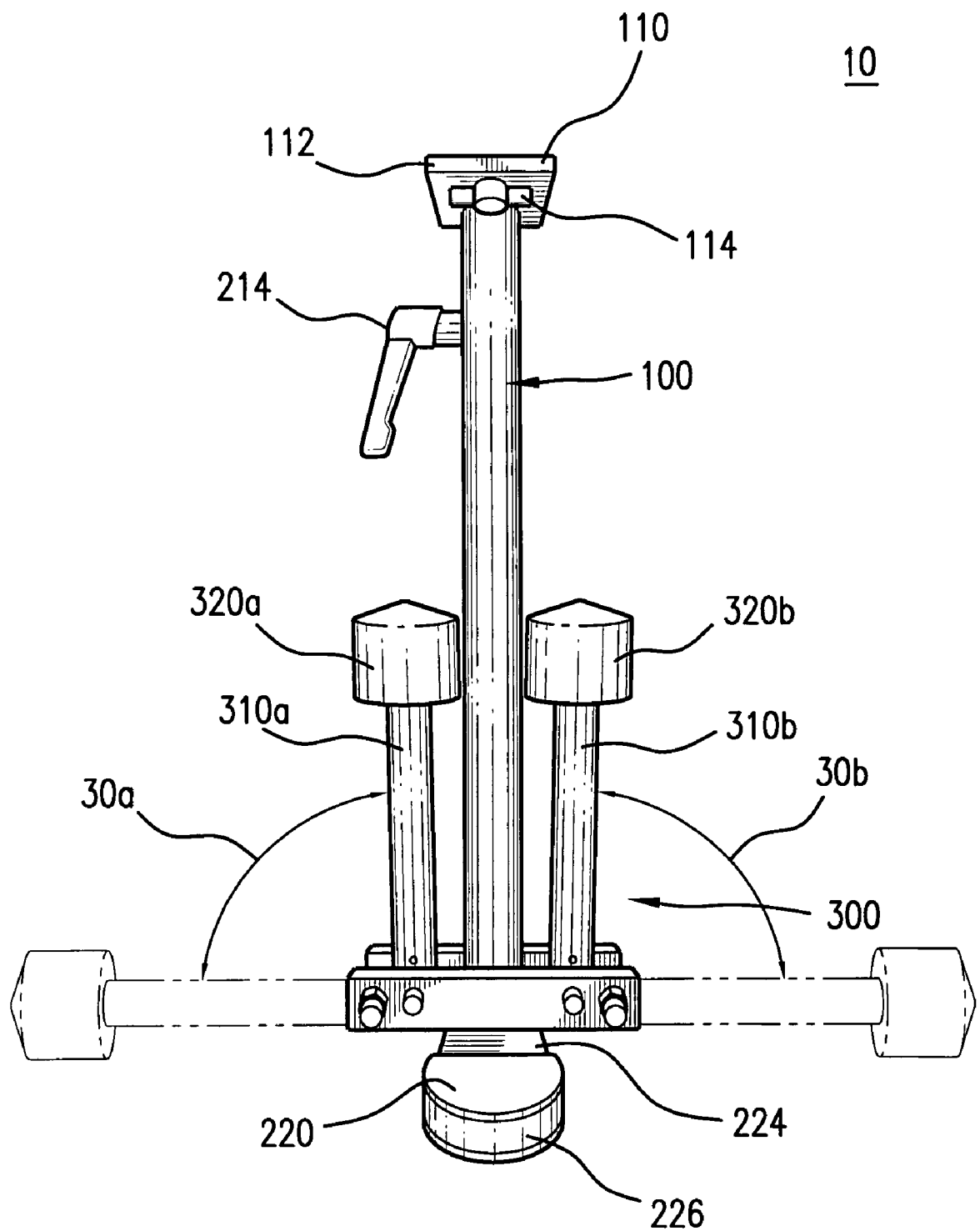
FIG. 2 is a front view of the embodiment shown in FIG. 1, illustrating the collapsibility of certain portions thereof.
Figure 3:
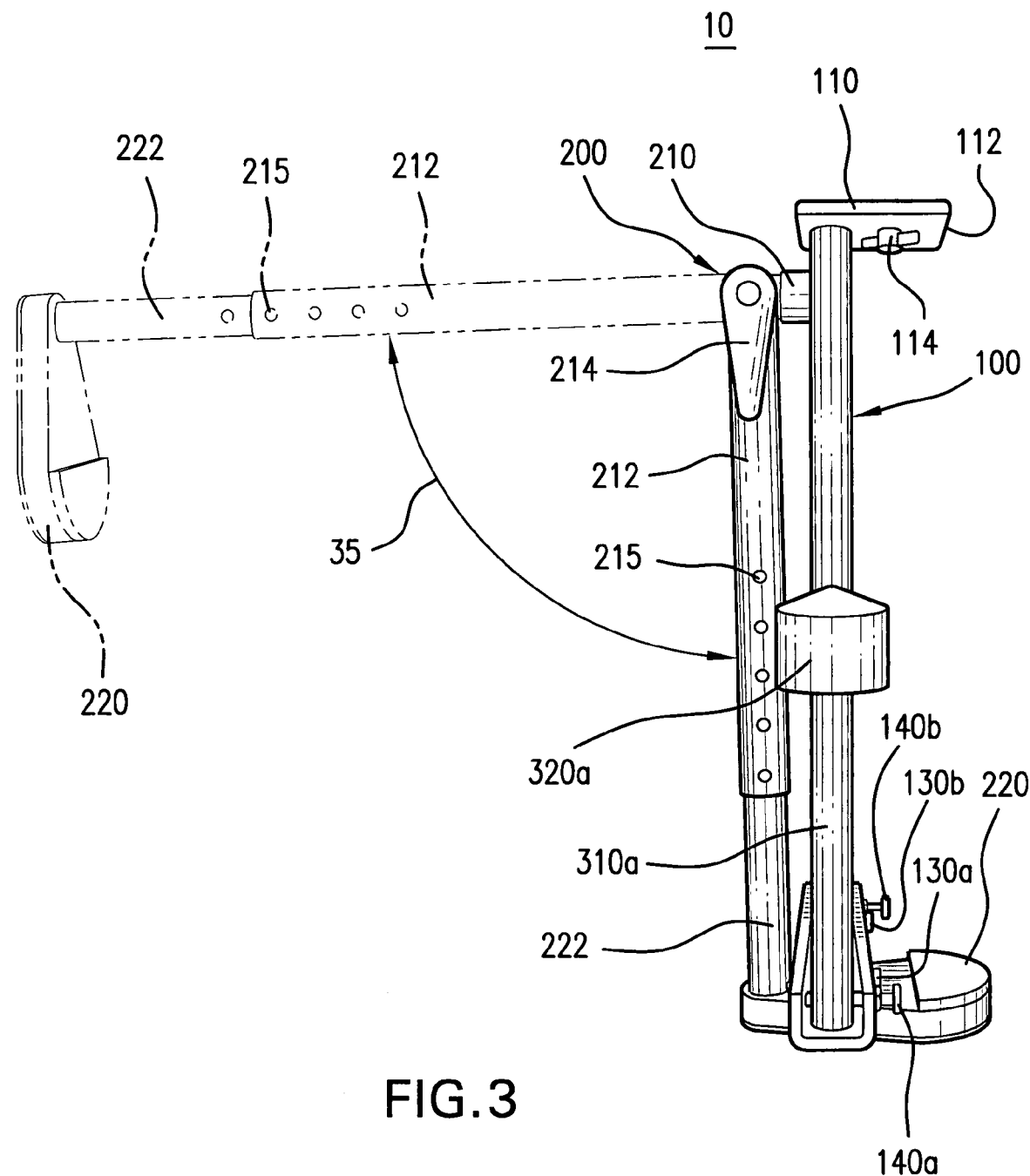
FIG. 3 is a side view of the embodiment shown in FIG. 1, illustrating the collapsibility of certain other portions thereof.

Turning more closely to FIGS. 1-3, the ergonomic apparatus 10 generally includes a plurality of frame members and components which preferably combine to form a structure that is collapsible for storage or for use in a modified configuration. In alternate embodiments, the various members may be more fixedly disposed to the extent necessary to simplify the resulting structure and maximize strength.

In the embodiment illustrated, apparatus 10 generally includes a neck member 100 and a spine member 200 extending transversely rearward therefrom. Further down the neck member 100, a stabilizing handle assembly 300 is disposed, having a pair of laterally extendable stabilizing arms 310a, 310b. A weighted stop member 220 is provided at a free end of the spine member 200 to provide leveraged rear weighting, while stabilizing weights 320a, 320b are provided on the respective stabilizing arm members 310a, 310b to be suspended thereby laterally away from the neck member 100. The stabilizing weights 320a, 320b are preferably positioned toward the outer extremities of their respective stabilizing arm members 310a, 310b so as to provide lateral counter balancing effect about the neck member 100 (and the video device 50 it supports on the device mount 110).

Neck member 100 serves as a longitudinally extended support for a device mount 110 having a platform 112, and a fastening element 114 which mates to a corresponding structure on a video device for securement to the platform 112. Device mount 110 may be of any suitable type and structure known in the art to accommodate the video device to be mounted.

Spine member 200 preferably includes first and second sections 212, 222 which are telescopically coupled for axial length adjustment as indicated by the directional arrows 20. Corresponding coupling holes 215 are preferably formed in the first and second sections 212, 222 to facilitate convenient releasable locking using such suitable fastening measures as spring loaded pins or the like to set the spine member 200 at an adjusted length suitable for both the bodily dimensions of the given user and the effective frontal weight of the apparatus when and particular video device to be mounted thereto.

Spine member 200 is preferably coupled in pivotably displaceable manner to neck member 100. In the embodiment shown, an inner end of the first section 212 is coupled at a pivot point transversely offset from the neck member 100 by a stem 210 preferably extending therefrom to permit sufficient clearance when spine member 200 is pivotally displaced along the path illustrated by the directional arrows 35 between its fully extended and collapsed, or retracted positions. In alternate embodiments, spine member 200 may be coupled about a pivot point defined directly on or more closely adjacent to the longitudinal axis of neck member 100. Preferably, the pivotal coupling is releasably locked by a fastening member 214 having an easily manipulable handle such as that shown, whereby a user may quickly and conveniently lock/release the spine member 200 at/from its fully extended or stowed positions, or at any intermediate angular position therebetween.

In its fully extended position, the spine member 200 is preferably, though not necessarily, disposed approximately at a normal angle or less relative to the neck member 100. Beyond normal (as measured upward from neck member 100), particular care must be taken to compensate for the heightened tendency for the apparatus to slip forward along the user's shoulder. In the collapsible embodiment shown, the spine member 200 is adjustable in angular position (along the path 35) to a selected acute angle relative to the neck member 100.

As described in following paragraphs, apparatus 10 is typically carried on a shoulder of the user during use. That is, an intermediate portion of the spine member 200 is brought to rest upon the user's shoulder. A cushioned pad 250 or other such resilient element may be ensleeved upon the spine member 200 at that intermediate point for added comfort to the user. The weighted stop member 220 extends downward preferably from a portion of the spine member 200 at or near its free end for maximum leverage, and is configured in the embodiment shown with a heel portion 226 terminating a main body portion 224. Member 220 is of sufficient weight density for leveraged offset of at least a substantial portion of the apparatus weight forward of a fulcrum effectively defined at the spine member's point of rest on the user's shoulder.

The weighted stop member 220 thus serves in part to ensure that the apparatus center of gravity is substantially defined near if not actually at that effective fulcrum point. The leveraged weighting that member 220 provides also enables the user to freely pivot the apparatus 10 about that effective fulcrum point, tilting and turning it thereabout with very little effort.

The apparatus 10 is preferably configured in the embodiment shown to remain forward biased about so supported on the user's shoulder. It tends preferably to tip forward when released from the user's grip, such that the lower extremities of its frontal portions come to bear against the user's frontal midsection to assume a resting position. The weighted stop member 220 serves to retentively bear against a shoulder blade region of the user's back to keep apparatus 10 from sliding completely forward and fall altogether off the user.

The stabilizing assembly 300 is preferably coupled to the neck member 100 at or near its lower end. This assembly includes at least a pair of stabilizing arm members 310a, 310b which in their operational positions extend laterally outward from the lower portion of the neck member to provide stabilizing weight, as well as to provide convenient points for user handling. In certain embodiments, the stabilizing arm members 310a, 310b may themselves be sufficiently weighted to substantially counter balance one another and provide suitable frontal loading for the apparatus 10. In the embodiment shown, however, each of the stabilizing arm members 310a, 310b is supplemented with at least one stabilizing weight 320a, 320b disposed at or near its outer end. The stabilizing weights 320a, 320b are thus suspended by the respective stabilizing arm members 310a, 310b in laterally offset manner from the neck member 100 for enhanced counter balancing effect about the neck member 100 and mounted video device.

Each of the stabilizing arm members 310a, 310b is pivotally coupled in the illustrated embodiment to a support bracket 120 extending from the neck member's lower portion. The stabilizing arm members 310a, 310b may thus be pivotally displaced along the directional arrows 30a, 30b between fully extended and stowed positions. They may in alternate embodiments be coupled more directly to the longitudinal shaft of the neck member 100.

The stabilizing arm members 310a, 310b in the embodiment shown are pivotally coupled to the support bracket 120 by respective pins 130a, 130b. Preferably, spring loaded locking pins or other such fastening devices 140a, 140b are provided at points on the support bracket 120 offset from the pivot pins 130a, 130b to lock the respective stabilizing arm members 310a, 310b in their operational positions. While not fully shown, suitable accommodating openings are formed in each of the stabilizing arm members 310a, 310b to accommodate such pins 130a, 130b, 140, 140b.

When apparatus 10 is collapsed to its fully stowed configuration such as shown in FIGS. 2-3, the foot-like extension of the weighted stop member 220 tucks underneath the support bracket 120. The fastening handle 214 may then be tightened to secure the spine member's angular position, extending alongside the neck member 100, and the spine member's length may be adjusted thereafter to raise the weighted stop member 220 upward to close tightly against the bottom of the support bracket 120. With the stabilizing arm members 310a, 310b also turned correspondingly upward to extend alongside the neck member 100, a tightly compacted structure is provided for the user to conveniently carry or store away.

To subsequently configure the apparatus 10 for use, the spine member 200 may be extended in length to clear the weighted stop member 220 away from the support bracket 120. The fastening handle 214 may then be loosened and the spine member angularly displaced along the directional arrow 35 to the desired extended position before the handle 214 is re-tightened. The stabilizing arm members 310a, 310b may likewise be angularly displaced along the directional arrows 30a, 30b and locked at their operationally extended positions.

Figure 4:
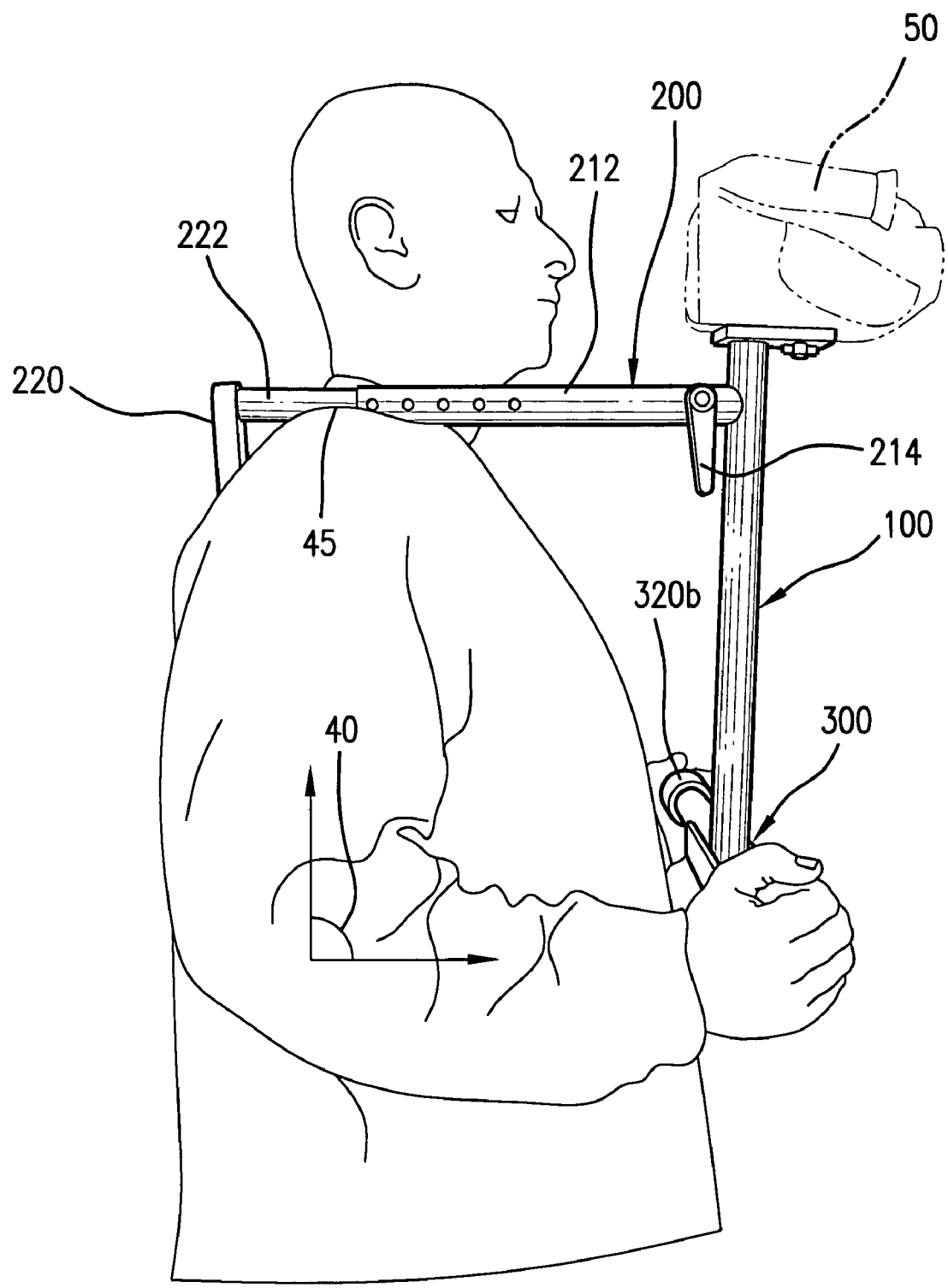
FIG. 4 is a side view illustrating the embodiment shown in FIG. 1 during exemplary use.
Figure 5:
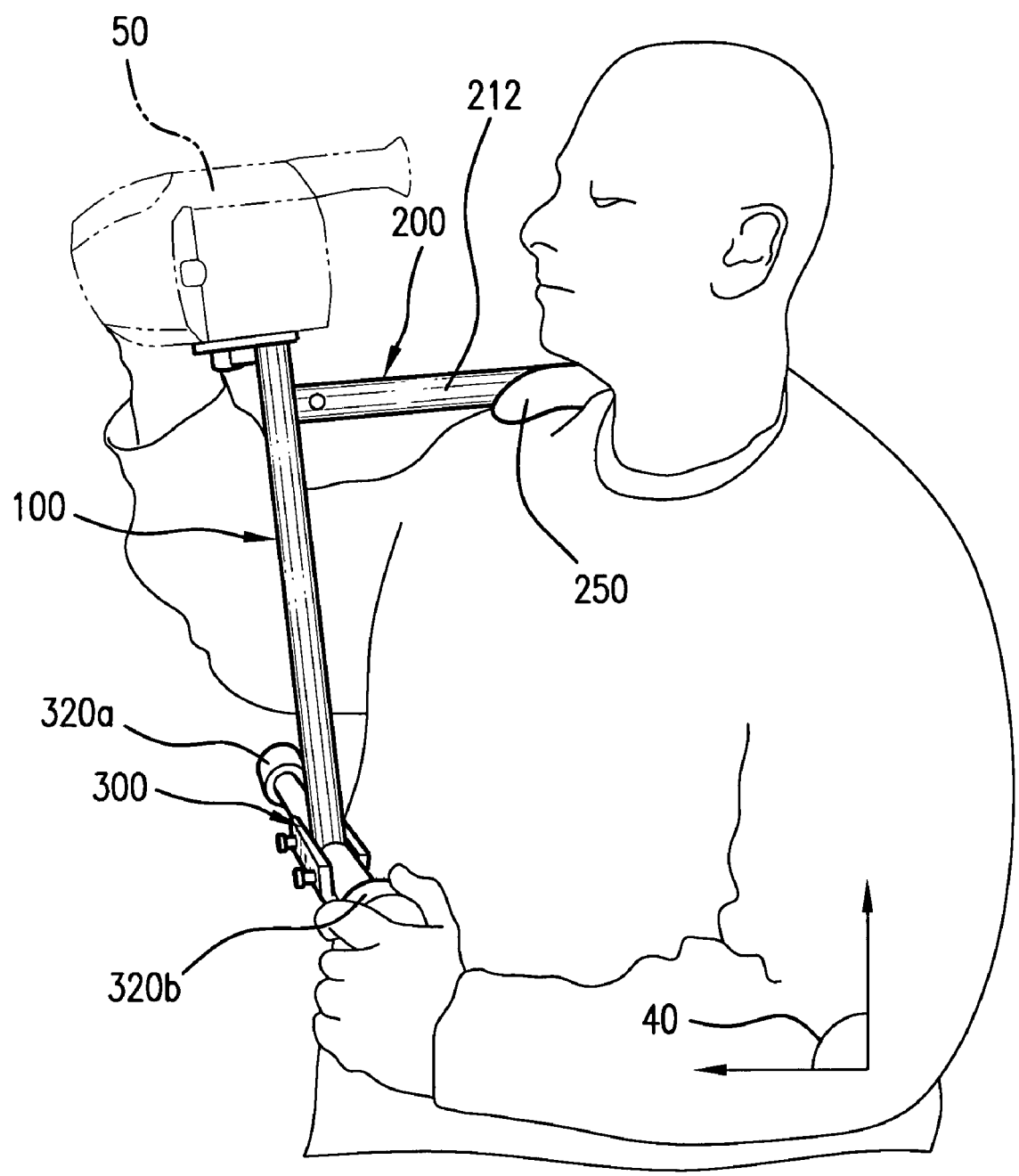
FIG. 5 is an opposite side view illustrating the embodiment of FIG. 1 during exemplary use.
Figure 6:
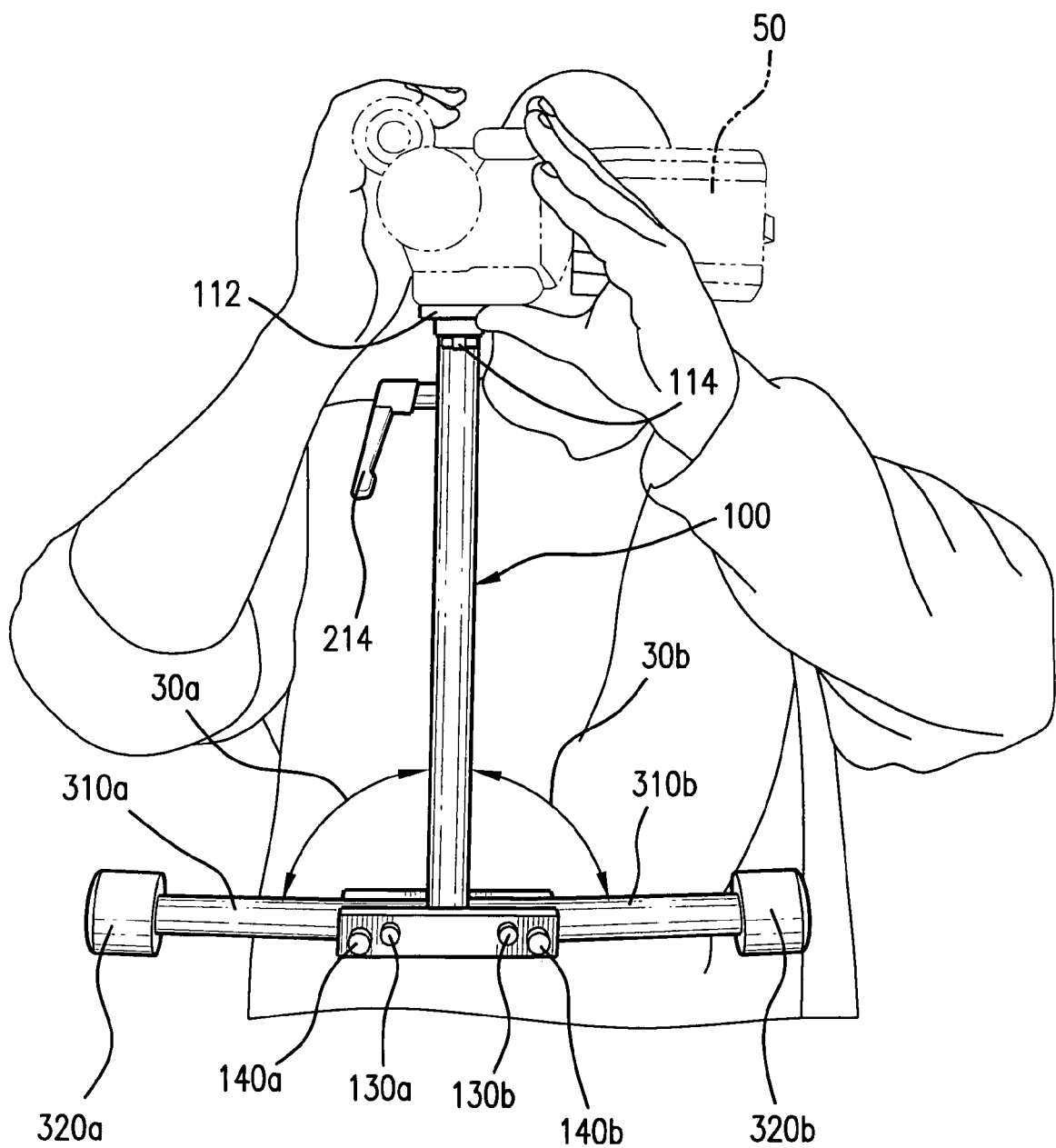
FIG. 6 is a front view illustrating the embodiment of FIG. 1 during exemplary use; and, FIG. 7 is a perspective view of an apparatus formed in accordance with an exemplary alternate embodiment of the present invention.

Turning next to FIGS. 4-6, apparatus 10 is shown in typical use to support a portable video device 50 for operation. As there shown, apparatus 10 is suitably configured for the particular user so that he may grip the stabilizing arm members 310a, 310b or stabilizing weights 320a, 320b with arms resting conveniently at his side and bent at the elbows at a comfortable angle 40. One of the user's shoulders supports an intermediate portion of the spine member 200 such that a fulcrum 45 is effectively defined for the apparatus 10 at that point of support. By simply grasping one or both of the stabilizing arm members 310a, 310b (or their stabilizing weights 320a, 320b), the user may freely pivot apparatus 10 about the effective fulcrum point 45, easily tilting or turning it to appropriately orient the supported video device 50.

The ease of use in this regard depends largely on the degree to which apparatus 10 is properly configured for a particular user's bodily dimensions. In most applications, the adjustability of a frame member such as the spine member 200 renders apparatus 10 sufficiently adaptable. In certain alternate embodiments, however, the neck member 100 or the stabilizing arm members 310a, 310b may also be adjustable in length for greater adaptability in custom configuring the apparatus 10 for a particular user.

When properly utilized, apparatus 10 affords the user much freer use of his or her hands during operation of the video device 50. As illustrated in FIGS. 4-6, the user may at his option use either, both, or none of his hands to hold the apparatus (by the stabilizing arm member(s) 310a, 310b, for instance, or their stabilizing weights 320a, 320b). One or both of the user's hands may be freely used where necessary to access all the different control buttons and switches distributed over the various sides of the video device 50.

An overall effect of the apparatus structure is to distribute its loaded weight (loaded by the video device 50) about a center of gravity defined substantially along an intermediate portion of the spine member 200 somewhere in the vicinity of, if not directly at, the effective fulcrum point 45. Preferably, this center of gravity is defined slightly forward of the fulcrum point 45 so that when the user altogether releases his or her hold of the apparatus 10 or its mounted video device 50, the apparatus 10 will preferably lean forward slightly, and its the lower extremities of the apparatus (support bracket 120, stabilizing arm members 310*a*, 310*b*, stabilizing weights 320*a*, 320*b*) rest against the user's frontal midsection. The user may then tilt the apparatus 10 up off its rest position by pivoting it slightly upward about the fulcrum point 45.

Moreover, where the user must move during video device operation to follow the action being 'shot,' the resultant shake and vibratory shock, which would de-stabilize the video image otherwise, are dampened by the apparatus 10 in accordance with one aspect of the present invention. While all shaking and vibratory movement in the image cannot be wholly abated in most circumstances, the apparatus provides substantial dampening effect on the same. The captured video images thus emulate video images captured by a much more substantial and sizable broadcast-type video camera of the type whose video images tend to be largely immune to such excessively high frequency shaking and vibratory movement (characteristic of much more compact devices such as hand-held video cameras and the like). The discernable movement in the video captured by device 50 tends therefore to be much more tolerable, and even desirable for certain artistic effect, as they align more closely with the movements that one would perceive had the action been viewed live with one's own eyes.

When utilized as illustrated in FIGS. 1-4, apparatus 10 provides a measure of isolation from the user's body not heretofore seen in known support means for video devices. As it is primarily supported at the fulcrum point 45 in freely pivoted manner, rather than being more fixedly secured to the user, apparatus 10 does not tied to every movement and contortion of the user's body. For instance, the frontal portions of the apparatus will remain most of the time during video device operation spaced apart from the user's mid-section, so that the jarring movements and contortions naturally occurring there while the user is walking to follow the action, for example, are not transferred necessarily to the apparatus.

The ergonomic aspects of apparatus 10 allow for prolonged periods of use without excessive fatigue or uncomfortable physical strain on the user. Operating the video device 50 in the usual hand-held manner would require the user to hold that video device 50 up at eye level, and to do so continually with the same hand while the device 50 is operating. This not only results in quick fatigue of the entire arm, shoulder, and hand doing the holding, it limits accessibility to those control buttons and switches underneath the palm of the holding hand. This, coupled with the excessive shaking and vibration unavoidable with the unsteadied human hand, make for inferior video quality, even when captured by the user while remaining at a virtual standstill.

Apparatus 10 affords numerous other practical advantages. For example, the weighted stop member 220 and stabilizing weights 320*a*, 320*b* provide for points for stable support should the user wish to momentarily set the apparatus 10 down on a support surface. The various members of the apparatus 10 also provide convenient gripping points should the user wish to operate the video device 50 at less conventional positions and orientations. An example in this regard may be where a user wishes to capture video from a ground-up perspective. He or she might then grasp an intermediate portion of the spine member 200 to thereby hold the video device 50 somewhat near the ground and angle it upwards. Alternatively, the user may wish to raise the video device 50 up and over a sight obstruction by grasping a lower portion of the neck member 100 and raising the apparatus 10 over his or her head such that the video device 50 clears the obstruction.

Figure 7:
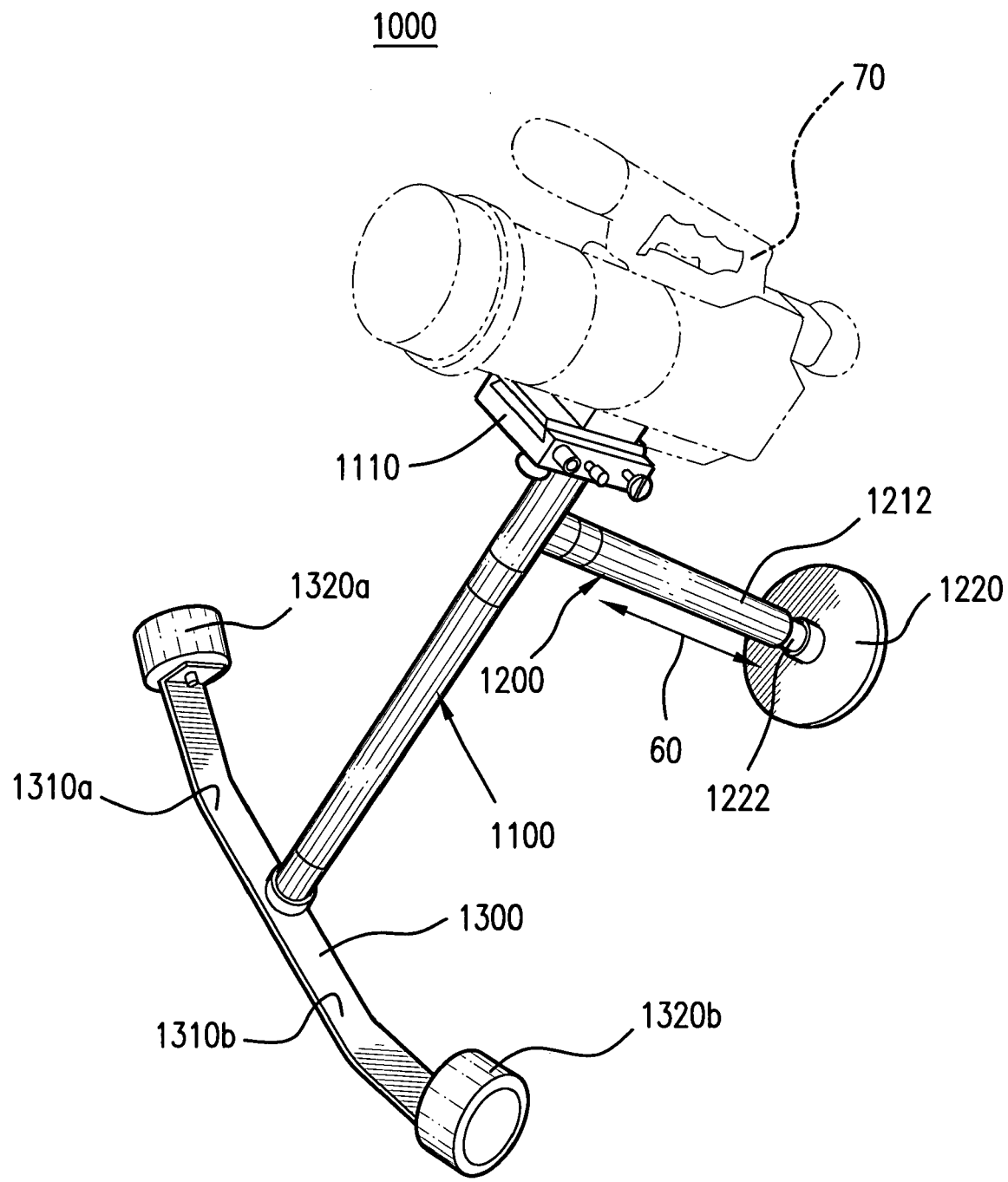

Referring now to FIG. 7, there is shown an apparatus 1000 formed in accordance with an alternate embodiment of the present invention. Apparatus 1000 is configured to operate in much the same manner as apparatus 10 described in accordance with the preceding embodiment. In this embodiment (shown for illustrative purposes with portable device 70 and device mount 1110 of different types known in the art), each of the stabilizing arm members 1310*a*, 1310*b* are integrally formed as parts of a stabilizing assembly 1300 secured to a bottom end of a neck member 1100. Each of the stabilizing arm members 1310*a*, 1310*b* is bent slightly upward to terminate at a stabilizing weight member 1320*a*, 1320*b*. The spine member 1200 in this embodiment remains adjustable in length, along the directional arrows 60, by the telescopic coupling of first and second sections 1212, 1222. While not shown, any suitable fastening member known in the art may be employed to releasably lock the two sections 1212, 1222 one relative to the other. A disk-shaped weighted stop member 1220 terminates an outer end of the second section 1222, and extends radially from that second section 1222 to serve the leveraged weighting and retentive engagement functions as described in connection with the preceding embodiment.

The spine member 1200 is fixedly coupled in this embodiment to extend transversely rearward from the neck member 1100. The spine member 1200 in this embodiment is fixedly set in the embodiment to extend at a preselected angle relative to the neck member 1100, for simplicity. The various members of this apparatus 1000 are formed of a metallic or other suitable material known in the art to provide the weight and strength sufficient to realize the advantages in ergonomic and video image movement dampening respects as described in connection with the preceding embodiment.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, and certain features may be used independently of other features, all without departing from the spirit or scope of the invention as defined in the appended Claims.

What is claimed is:

1. A stabilizing support apparatus for video devices comprising:
   a longitudinally extended neck member supporting a device mount coupled thereto;
   a spine member adapted to be positioned on a shoulder of a user, said spine member being fixedly coupled to said neck member for bearing the weight of the apparatus when positioned on said user's shoulder, said spine member extending in a transverse direction from said neck member; said spine member having a weighted stop member adjacent a free end thereof; and,
   a pair of stabilizing arm members extending laterally in a direction substantially perpendicular to said transverse direction, said arm members being located on a lower portion of said neck member; each said stabilizing arm member suspending a stabilizing weight in a laterally offset manner from said neck member;
   whereby mechanical forces imparted to a video device mounted on said device mount are dampened for stabilizing video images generated thereby;

wherein said stabilizing weight or said stabilizing arm provides a hand-graspable area for stabilizing or manipulating said apparatus.

2. The stabilizing support apparatus as recited in claim 1, wherein said apparatus is at least partially collapsible, at least one of said spine and stabilizing arm members being retractably coupled to said neck member.

3. The stabilizing support apparatus as recited in claim 2, wherein each of said spine and stabilizing arm members is angularly displaceable relative to said neck member.

4. The stabilizing support apparatus as recited in claim 2, wherein said spine member is coupled in angularly adjustable manner to said neck member to be releasably locked at a selected one of a plurality of angular positions relative thereto.

5. The stabilizing support apparatus as recited in claim 1, wherein said spine member is telescopically adjustable in length.

6. The stabilizing support apparatus as recited in claim 1, wherein each said stabilizing arm member includes at least one stabilizing weight coupled thereto, each said stabilizing weight being disposed at a terminal end of one said stabilizing arm member.

7. The stabilizing support apparatus as recited in claim 1, wherein said spine member is disposed to extend from said neck member at an approximately perpendicular maximum angle relative thereto.

8. The stabilizing support apparatus as recited in claim 1, wherein said members thereof collectively define a center of gravity substantially for said apparatus at an intermediate portion of said spine member, whereby said apparatus is maintained in user manipulable manner about a shoulder of the user responsive to said spine member being intermediately supported thereon.

9. The stabilizing support apparatus as recited in claim 8, wherein said stabilizing weights substantially counterbalance said apparatus laterally about said neck portion thereof, and said weighted stop member counterbalances a substantial portion of said apparatus forward of said spine member intermediate portion resting upon the shoulder of the user.

10. An ergonomic support apparatus for stabilizing support of portable video devices comprising:

a neck member extending longitudinally downward from a device mount coupled thereto;

a spine member adapted to be positioned on a shoulder of a user, said spine member being fixedly coupled to said neck member for bearing the weight of the apparatus when positioned on said user's shoulder, said spine member extending in a transverse direction from said neck member; said spine member having a weighted stop member extending therefrom, said weighted stop member being spaced in adjustable manner from said neck member; and, a pair of stabilizing arm members extending laterally in a direction substantially perpendicular to said transverse direction, said arm members being located on a lower portion of said neck member; said stabilizing arm members each suspending at least one stabilizing weight to be laterally offset from said neck member for substantial counterbalancing thereabout;

whereby vibratory or shaking forces imparted to a portable video device mounted on said device mount are dampened;

wherein said stabilizing weight or said stabilizing arm provides a hand-graspable area for stabilizing or manipulating said apparatus.

11. The ergonomic support apparatus as recited in claim 10, wherein said apparatus is at least partially collapsible, at least one of said spine and stabilizing arm members being retractably coupled to said neck member.

12. The ergonomic support apparatus as recited in claim 11, wherein each of said spine and stabilizing arm members is angularly displaceable relative to said neck member and releasably locked in at least one of a plurality of angular positions relative to said neck member.

13. The ergonomic support apparatus as recited in claim 10, wherein said spine member is telescopically adjustable in length.

14. The ergonomic support apparatus as recited in claim 10, wherein said stabilizing weights are disposed at respective terminal ends of said stabilizing arm members, and said spine member extends from said neck member at a preselected acute angle.

15. The ergonomic support apparatus as recited in claim 14, wherein said apparatus is distributed in weight to define a center of gravity substantially at an intermediate portion of said spine member, whereby said stabilizing arm members are maintained in user manipulable manner responsive to said spine member being intermediately supported upon a shoulder of the user, said stabilizing arm members being thereby disposed substantially at elbow height of the user, with said weighted stop member extending retentively downward from said spine member over the back of the user.

16. The ergonomic support apparatus as recited in claim 15, wherein said stabilizing weights substantially counterbalance said apparatus laterally about said neck portion thereof, and said weighted stop member counterbalances a substantial portion of said apparatus forward of a spine member intermediate point resting upon the shoulder of the user.

17. The ergonomic support apparatus as recited in claim 15, wherein said stabilizing weights substantially counterbalance said apparatus laterally about said neck portion, and said weighted stop member counterbalances a substantial portion of said apparatus forward of a spine member intermediate point, said stabilizing arm members being thereby manipulable to pivotally re-orient said apparatus about a fulcrum point defined at said spine member intermediate point.

18. An ergonomic support apparatus for stabilizing support of portable video devices comprising:

a neck member extending longitudinally downward from a device mount coupled thereto;

an adjustable spine member bearing the weight of the apparatus when over a user's shoulder and coupled to extend transversely rearward at a preselected acute angle from said neck member; said spine member having a weighted stop member extending from a free end thereof, said weighted stop member being adjustable in spacing from said neck member; and, a pair of stabilizing arm members extending laterally in a direction substantially perpendicular to said transverse direction, said arm members being located on a lower portion of said neck member; each said stabilizing arm member extending laterally to at least one stabilizing weight for substantially counterbalancing said apparatus about said neck member;

said apparatus having a center of gravity defined substantially at an intermediate portion of said spine member, whereby said stabilizing arm members are maintained for a user manipulable manner responsive to said spine member being intermediately supported upon a shoulder of the user;

whereby mechanical forces imparted to a video device mounted on said device mount are dampened for stabilizing video images generated thereby;

wherein said stabilizing weight or said stabilizing arm provides a hand-graspable area for stabilizing or manipulating said apparatus.

19. The ergonomic support apparatus as recited in claim 18, wherein said apparatus is at least partially collapsible, at least one of said spine and stabilizing arm members being disposed in angularly displaceable manner relative to said neck member for displacement between retracted and extended positions, said member being releasably locked in at least said extended position.

20. The ergonomic support apparatus as recited in claim 18, wherein said spine member is telescopically adjustable in length and extends from said neck member at a preselected acute angle, said stabilizing weights being disposed at respective terminal ends of said stabilizing arm members.

* * * * *